July 3, 1956 W. A. RENGERING 2,752,634
WHEEL FORMING MACHINE
Filed March 2, 1953 2 Sheets-Sheet 1
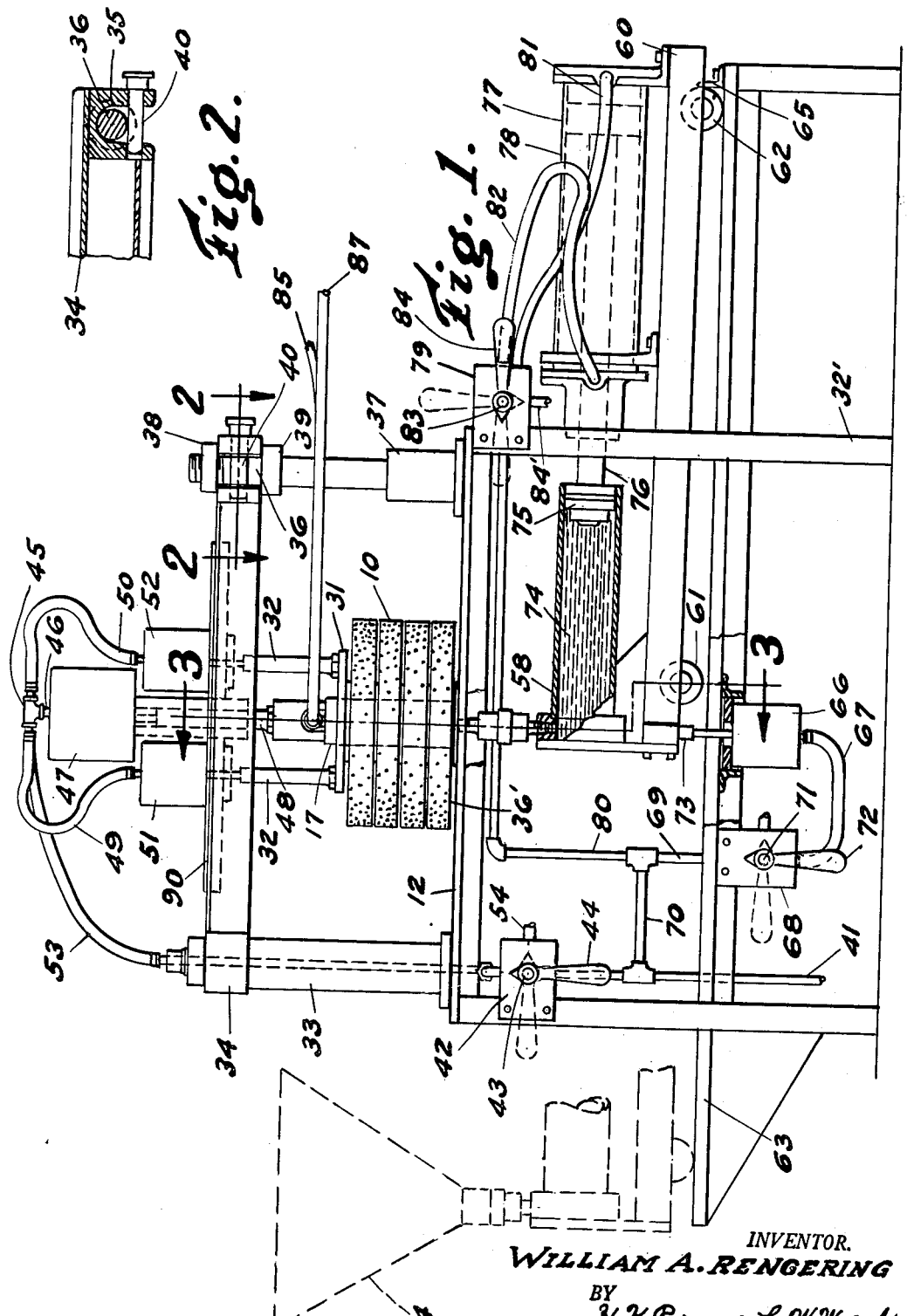
INVENTOR.
WILLIAM A. RENGERING
BY
H. K. Parsons & C. W. Wright
ATTORNEYS

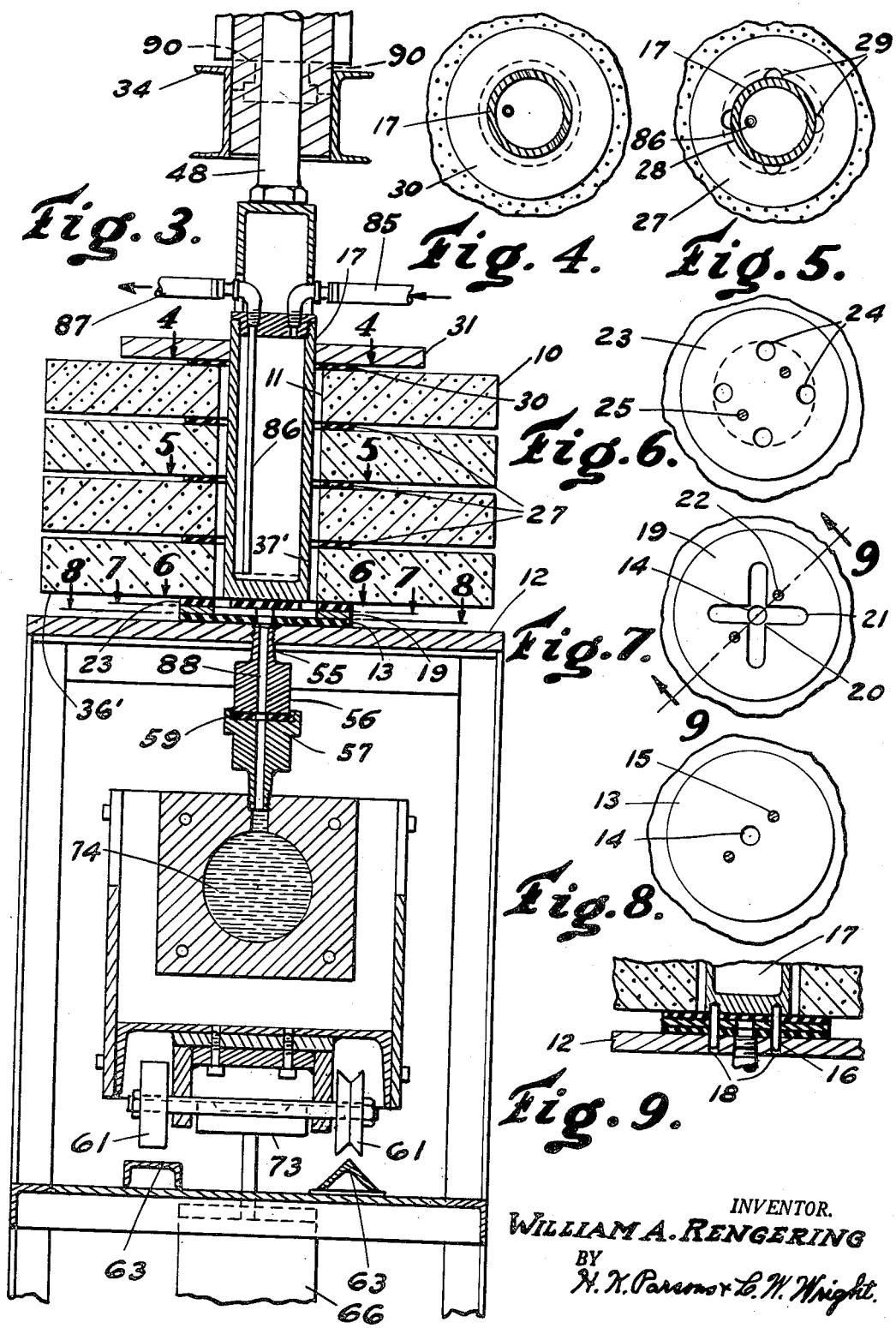

United States Patent Office 2,752,634
Patented July 3, 1956

2,752,634

WHEEL FORMING MACHINE

William A. Rengering, Cincinnati, Ohio, assignor to The Cincinnati Milling Machine Co., Cincinnati, Ohio, a corporation of Ohio Application March 2, 1953, Serial No. 339,871

4 Claims. (Cl. 18—30)

This invention relates to improvements in machines for forming grinding wheels and has particular reference to a machine adapted for producing wheels of the type shown in co-pending application, Serial No. 338,671.

One of the objects of the present invention is the provision of an improved machine particularly adapted for use in producing a plastic or composition wheel bushing or center in the bore of previously produced grinding wheels.

A further object of the invention is the provision of a machine of this character which will facilitate the ready introduction of the center forming material into the wheel bore, the compacting of the introduced material, and the subsequent hardening or solidification of same.

A further object of the invention is the provision of a machine of this character which will facilitate the ready loading and clamping in position of the articles to be worked upon and their subsequent easy removal from the machine tool on completion of the forming operation.

An additional object is the provision of an improved structure for facilitating the loading and maintenance of the supply of material to be introduced in a position sufficiently remote from the heating element employed that the material in the container will be substantially unaffected by the curing or solidifying operation and in which the injection passage may be readily cleared without disassembly of the machine.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 1 is a side elevation of a machine embodying the present invention.

Figure 2 is a fragmentary sectional view on the line 2—2 of Figure 1.

Figure 3 is a vertical section on the line 3—3 of Figure 1.

Figure 4 is a plan view of the upper sealing gasket with the heating member shown in section, as indicated by the line 4—4 of Figure 3.

Figure 5 is a similar view of an intermediate sealing element with parts sectioned as indicated by the line 5—5 of Figure 3.

Figures 6, 7, and 8 are corresponding transverse sectional views on the section lines 6—6, 7—7, and 8—8 respectively of Figure 3, and Figure 9 is a fragmentary vertical section taken on the line 9—9 of Figure 7.

In the drawings, the numeral 10 designates the outer or abrasive portion of a vitreous or resinoid grinding wheel ring or disc of conventional annular form having a central bore or aperture bounded by the inner annular wall 11, which wall is preferably machined or molded to produce a slightly irregular or hill and valley surface.

The wheels of the present invention may be produced either individually or in series as is indicated in Figures 1 and 3. In their production use is made of a molding press including the frame or table section 12 on which is mounted a sealing gasket or disc 13 preferably of neoprene rubber or other compressible sealing material having a central material receiving aperture 14 and the sockets or holes 15 to receive the positioning pins 16 carried by the removable heating element or core 17. These pins extend downwardly through the apertures 15 into the sockets 18 formed in the bed or table 12.

Mounted on the member 13 is the distributor plate 19 having a central aperture 20 aligning with the aperture 14 and the cruciform distributing grooves or slots 21, this plate having apertures 22 through which the pins 16 extend.

Mounted on the plate 19 is a second sealing gasket washer or disc 23 having the suitably located material transmitting apertures 24 adapted to overlie the outer ends of the slots 21 in the plate 19 and the apertures 25 to receive the positioning pins 16 of the heating element.

In the formation of the present improved wheel structure a wheel annulus 10 is placed on the sealing member 23 with its aperture 11 in centralized relationship to the member 23 and its material transmitting apertures 24.

This centralization may be effected by suitable conventional centering devices engaging either the periphery of the wheel or interposed between the bore of the wheel and the periphery of the heating element, which rests on the disc 23 and is supported by the table.

In the event that it is desired simultaneously to produce a plurality of wheels the same are stacked one on top of the other as indicated in Figures 1 and 3, being separated by the preferably slightly compressible spacer discs 27, each having a central aperture 28 closely interfitting with the exterior of the heating element 17. These discs have the material transmitting cut-away portions or apertures 29 forming restricted arcuate gates or channels for flow of the bushing material lengthwise of element 17, successively to fill the several sealed-in spaces between the bores of various superimposed wheels. The thin sprues formed in said channels 29 will break readily for separation of the completed wheels. A stack of wheels and discs having been assembled, the upper end is sealed by the ring or washer 30 which closely fits the element 17 and over which is placed the clamp ring 31. The clamps 32 of the machine are then tightened to compress and lock the assembled stack and intermediate spacers together as a unit.

The bed or table 12 is supported by a frame 32' having rising therefrom the column or post 33 on which swings the arm 34 having a yoke 35 which in closed position spans the upper portion 36 of post 37 carried by the bed 12. The pair of collars 38 and 39 are carried by the post in position for closed interfitting engagement with the upper and lower faces of the yoke 35 to support the free end of the arm in position and restrain its vertical movement when closed. A sliding pin or latch member 40, passing through the arms of the yoke interfits with the portion 36 securing the arm in its closed position.

The arm 34 thus provides a transverse bridge or support in closed position overlying the heating element or core 17 and the work piece or work pieces 10 as supported by the table 12. Centrally mounted on and retractable by opening or counterclockwise swinging of arm 34 is the power cylinder 47 controlling the heating unit clamp 48. Spaced at the sides of the unit 47 are ways 90 slidably supporting the cylinders 51 and 52 of the work holding arms or clamps 32, permitting sliding adjustment of the members 32 in accordance with the size or pressure reaction desired as respects the sub-tending clamped disc 31.

A compressed air pipe 41 connected with a suitable source of supply extends through the casing 42 of three-way valve 43 actuable by handle 44 and by way of the column 33 to the distributor coupling 45. From 45 extends a pipe or connection 46 to the clamp cylinder 47 for the heating element locking ram 48. Additional pipes 49 and 50 couple the compressed air supply to the cylinders 51 and 52 of the wheel stack clamps 32. When the handle 44 is positioned as shown by the full lines, Figure 1, the compressed air will be connected simultaneously to the three clamp cylinders 47, 51, and 52 so that the stack of wheels 10 will be securely clamped in position on the table 12 and at the same time the heating element 17 will be correspondingly tightly clamped to prevent any disruption in position of the parts during building-up of pressure of the wheel center or forming material. The pressure of the clamps 32 is sufficient to hold down and compress the gaskets such as 27 and 30 against the wheels and the central heating element 17 properly to seal the central bushing receiving bores of the several wheel elements 10.

When the handle 44 is moved to dotted line position, the supply of compressed air will be cut off as respects the upper extension 53 of the conduit 41, and this portion 53 will be coupled to the exhaust pipe or conduit 54, releasing pressure in the cylinders 47, 51 and 52, permitting or effecting the retraction of the clamp rams 32 and 48, releasing the pressure on the heating element and on the assembled stack of work pieces being operated upon. When the clamps have been released, pin 40 may be moved to an unlocking position and the arm 34 swung to one side when the heating element 17 may be withdrawn and the stack of wheels individually or as an entirety removed from the machine.

The present machine is primarily designed for the production of complete brasive wheels of the type shown in my co-pending application, Serial No. 338,671, comprising the outer wheel portion of annular form having a contained integrally united center or bushing which may advantageously comprise a mineral aggregate combined with a saturate or substantially saturate resin vehicle of thermo-setting characteristic as the basal elements. A composition comprising:

Polyester resin, 1800 gms.
Catalyst such as benzoyl peroxide, 27 gms.
Flint (100–200 mesh), 2160 gms.
Glass wool, 42 gms.
Sand (25 mesh), 2700 gms.

has been found very efficient. This basically provides a mineral aggregate made up of intermingled particles of a course filler and a fine filler with sufficient of a liquid type thermo-setting resin to serve as a vehicle while the material is being introduced into position and as an adequate binder which, when hardened, will be tough and relatively non-chipping. At the same time the utilization of the mass of mineral aggregate provides a body portion which will be substantially solid in character, not open to the objection of swelling or shrinking or susceptibility to oils, greases and the like as are ordinary plastic structures and therefore particularly resistant to the effects of coolants and the like ordinarily used in connection with grinding operations. At the same time there is created in the center or bushing a composition which is comparable as respects physical and machining characteristics to those of the outer annulus so that the compound or composition wheel thus produced, can be readily faced, countersunk or the like across both the outer and inner annular portions by the conventional cone tool or other grinding or surfacing operations customarily employed in connection with ordinary types of abrasive wheels.

For supply of the bushing or wheel center forming material, the table 12 is provided with an injection fitting or distributor nozzle 55 having a portion aligned with the apertures 14 and 20 of the members 13 and 19. This member has a coupling head 56 engageable by socket 57 carried by the tank or cylinder 58, sealing means such as gasket 59 being interposed when the structure is in delivery position between the elements 56 and 57. Cylinder 58 is mounted on carriage 60 having the wheels or rollers 61 and 62 translatably supporting the carriage on the tracks 63 of frame 32. In its normal position the wheels 61 and 62 are in engagement with the track and the coupling elements 56 and 57 separated. Under these circumstances, the carriage may readily be moved toward the left hand position indicated in dotted lines in Figure 1 for loading of the cylinder 58 from a suitable source of supply such as indicated at 64.

When moved to its right hand position, the extent of this movement is determined by the stop member 65 on the frame, the coupling members 56 and 57 being then properly aligned. Mounted on the frame is a hydraulic clamp cylinder 66 coupled by pipe or conduit 67 through valve block 68 and conduits 69 and 70 to the air line or conduit 41. The valve 71, when shifted by handle 72 to the position shown in Figure 1, serves to couple compressed air to cylinder 66, raising the clamping ram 73 to lift the inner or left hand end of the carriage 60, moving and holding the member 57 in interlocking engagement with the head 56 as indicated in Fig. 1 and 3 so that the material indicated at 74 in the cylinder 58 may be injected or forced through the connections 57, 55 to aperture 14.

The necessary extruding pressure is created by the piston 75 on the left hand end of piston rod 76 which carries on its opposite end piston 77 movable in pressure cylinder 78 which is mounted on carriage 60. On the frame adjacent the cylinder 78 is valve block 79 coupled by branch pressure conduit 80 with the compressed air source 41—70, while extending from the valve block to the right hand end of the cylinder is conduit 81 and to the left hand end of the cylinder conduit 82. A valve 83 in the valve block 79 is actuable by handle 84 to couple either 81 or 82 to pressure while the opposite conduit is connected by way of the valve and valve block to exhaust conduit 84', this valve being a conventional type four-way valve construction.

When the valve is moved to the position shown in full lines in Figure 1, pressure is coupled through conduit 81 reacting on the right hand side of piston 77 and, in turn, moving piston 75 toward the left to force material 74 from tank 58 by way of aperture 14 in the sealing gasket 13, the gate plate 19, slots 21, and apertures 24 filling in the annular space intervening the heating element 17 and the wall 11 of the lower grinding wheel or annulus 10. It is then extruded upwardly through the various apertures 29 into the corresponding annular spaces of the superimposed discs until the entire area is completely filled as indicated in Figure 3. The material thus employed preferably includes a thermo-setting vehicle as heretofore described which is maintained under pressure during the curing or hardening of the bushings or central sections of the several wheels as thus produced. It will be noted that by the process of introducing this material under appreciable pressure from the bottom of the stack, due to its viscous character, the material will gradually rise in and completely and solidly fill and the space between the heating element 17 and the inner walls of each disc and become physically embedded in and interlocking with the inner walls 11 of the disc with a possibility of a certain penetration of the inner portions of the discs by the vehicle due to the permeability of the wheel material and the maintained pressure against the vehicle and suspended filler material. Also, by this manner of operation, any air entrained in the space to be filled will be adequately pushed out at the top of the stack, preventing bubble in clusions or the like in the final bushing or wheel center structure.

The material having been forced into the annular space intervening the element 17 and the wheel discs to completely fill said space, the pressure is preferably maintained while the element 17 is raised to and maintained at a temperature as, for example, 250 degrees F., thoroughly to cure or cause thermo-setting of the injected material.

It will be understood that various conventional types of heating elements capable of producing the necessary temperature and of sufficient rigidity to withstand the exteriorly built-up pressure may be utilized. In the present instance the member 17 has been illustrated as a closed cylinder to the upper portion of which is coupled the steam inlet pipe 85 and having extending substantially to the bottom of the interior the outlet pipe 86 coupled with the steam exhaust or return line 87. By this construction any steam condensate will be forced upward and out through the pipe 86 by the incoming pressure in 85, preventing any possibility of chilling or uneven heating due to accumulation of condensed steam in the lower portion of the heating element. The period of heating and the exact temperature employed may be varied in accordance with the known temperature setting characteristics of the particular thermosetting vehicle being utilized.

The maintenance of the pressure on the plastic material insures production of a highly compacted bushing or wheel center firmly mechanically interlocking with the outer wheel structure. When the material has set, the individual wheels thus produced will be a substantially integral or homogeneous structure, including the outer abrading portion and the inner smooth faced bushing or central portion of proper size to fit a prescribed wheel arbor dimensionally corresponding to the exterior of the heating element 17 without the necessity of additional forming or machining operations and capable of adequately accurately supporting the wheel on the arbor for subsequent use.

It will be understood that in the production of a single wheel in accordance with the present invention the lower face 36', at least, of the wheel is first formed with a plane or finished surface normal to the axis of the wheel for accurate location by the supporting gate plate and sealing gaskets and that in the case of simultaneous production of a multiple number of wheels that the several faces of the various wheels are preferably correspondingly so faced in order that the molded inner bushing surface at 37' may be in proper relationship to the plane of the wheel.

The centers having been suitably formed and completed, the various clamps for securing rams are released when the carriage 60 will be restored in its entirety in position on the tracks 63. The heating element and wheel units may then be removed from the machine, exposing the upper end of the freed injector, when by slight endwise movement of the carriage, the lower end of the injector will be cleared by member 57 and any semi-solid contained slug of the bushing forming material 74 in the passage 88 readily cleared. It will be understood that the member 57 is sufficiently remote from the heating element and associate parts that no thermo-setting action will occur but the material in the cylinder 58 will remain in its free flowing condition ready for subsequent utilization.

What is claimed is:

1. A machine for forming bushings in the central aperture of annular abrasive wheel rings comprising a bed, a wheel supporting table carried by the bed, a removable heating core, means for clamping the core in position on the bed, independent means for clamping a wheel ring on the bed in spaced circumscribing relation to the core, means interfitting with the core and extending outwardly therefrom in overlying relation to the sides of a wheel ring for sealing off the space between the core and ring, means for injecting a thermo-setting bushing forming material into said sealed off space, said sealing means having distributor passages formed therein for discharge of material into the sealed space around the heating core, a distributor nozzle having a bore communicating with said passages and a material supply cylinder having an outlet fitting for detachable connection with the nozzle, a carriage supporting said cylinder, means translatably mounting the carriage on the frame for movement of the cylinder from a loading to a discharging position, and a pressure clamp reacting on the cylinder coupling when the carriage and cylinder are in discharge position for maintaining the cylinder outlet in tight interfitting engagement with the discharge nozzle fitting carried by the table, a pressure piston reciprocable within the cylinder to effect drawing in and extrusion of bushing forming material as respects the cylinder and a power actuator for the piston mounted on the carriage and movable with the cylinder whereby said actuator is effective for movement of the piston in any position of adjustment of the carriage.

2. A machine for the formation of compressed material centers in grinding wheels, including a bed having a work supporting table, a material injection nozzle carried by the table, said table having positioning sockets formed therein adjacent the nozzle, a work supporting sealing element carried by the table having a material receiving aperture aligned with the nozzle, a rigid distributor member supported by the sealing member having a central open portion alignable with the nozzle and radially extending distributing grooves, a second sealing member overlying the distributor member, said second sealing member having discharge apertures formed therein alignable with portions of the grooves of the member, a heating element unit centrally supported by said second sealing element, said heating element having positioning pins extending through the sealing and distributor members and fitting in the sockets in the table for insuring proper accurate relative positioning of the parts, the diameter of said heating element being less than the space intervening discharge apertures of the second sealing element whereby bushing forming material may be extruded from the nozzle by way of the groove and sealing element in circumscribing relation to the exterior of the heating element, means for clamping the heating element and associated parts in position on the table, spaced sealing elements interfitting the heating element and adapted to receive work pieces therebetween, said spaced elements having small sprue forming gate channels in circumscribing relation to the heating element for transfer of injected bushing forming material from one to another of the spaces between said elements, a space sealing member slidably interfitting with the portion of the heating element remote from the table, and clamp devices independent of the heating element clamping means carried by the machine and engageable with said remote sealing element for securing the sealing and spacer elements, together with any interposed work pieces in bushing forming position on the table.

3. A machine for the formation of compressed material centers in grinding wheels, including a bed having a work supporting table, a material injection nozzle carried by the table, said table having positioning sockets formed therein adjacent the nozzle, a work supporting sealing element carried by the table having a material receiving aperture aligned with the nozzle, a rigid distributor member supported by the sealing member having a central open portion alignable with the nozzle and radially extending distributing grooves, a second sealing member overlying the distributor member, said second sealing member having discharge apertures formed therein alignable with portions of the grooves of the member, a heating element unit centrally supported by said second sealing element, said heating element having positioning pins extending through the sealing and distributor members and fitting in the sockets in the table for insuring proper accurate relative positioning of the parts, the diameter of said heating element being less than the space intervening discharge apertures of the second sealing element whereby bushing forming material may be extruded from the nozzle by way of the groove and sealing element in circumscribing relation to the exterior of the heating element, means for clamping the heating element and associated parts in position on the table, spaced sealing elements interfitting the heating element and adapted to receive work pieces therebetween, said spaced elements having small sprue forming gate channels in circumscribing relation to the heating element for transfer of injected bushing forming material from one to another of the spaces between said elements, a space sealing member slidably interfitting with the portion of the heating element remote from the table, clamp devices independent of the heating element clamping means carried by the machine and engageable with said remote sealing element for securing the sealing and spacer elements, together with any interposed work pieces in bushing forming position on the table, a material conveying carriage movable on the bed, a supply cylinder on the carriage having a discharge fitting for interengagement with the nozzle on the table, and a power means carried by the machine and engaging the carriage to rock the carriage to maintain the fitting in material transferring engagement with the nozzle.

4. A machine for the formation of compressed material centers in grinding wheels, including a bed having a work supporting table, a material injection nozzle carried by the table, said table having positioning sockets formed therein adjacent the nozzle, a work supporting sealing element carried by the table having a material receiving aperture aligned with the nozzle, a rigid distributor member supported by the sealing member having a central open portion alignable with the nozzle and radially extending distributing grooves, a second sealing member overlying the distributor member, said second sealing member having discharge apertures formed therein alignable with portions of the grooves of the member, a heating element unit centrally supported by said second sealing element, said heating element having positioning pins extending through the sealing and distributor members and fitting in the sockets in the table for insuring proper accurate relative positioning of the parts, the diameter of said heating element being less than the space intervening discharge apertures of the second sealing element whereby bushing forming material may be extruded from the nozzle by way of the groove and sealing element in circumscribing relation to the exterior of the heating element, means for clamping the heating element and associated parts in position on the table, spaced sealing elements interfitting the heating element and adapted to receive work pieces therebetween, said spaced elements having small sprue forming gate channels in circumscribing relation to the heating element for transfer of injected bushing forming material from one to another of the spaces between said elements, a space sealing member slidably interfitting with the portion of the heating element remote from the table, clamp devices independent of the heating element clamping means carried by the machine and engageable with said remote sealing element for securing the sealing and spacer elements, together with any interposed work pieces in bushing forming position on the table, a material conveying carriage movable on the bed, a supply cylinder on the carriage having a discharge fitting for interengagement with the nozzle on the table, and a power means carried by the machine and engaging the carriage to rock the carriage to maintain the fitting in material transferring engagement with the nozzle, a pressure piston in the cylinder for effecting discharge of material through the fitting and nozzle, a second cylinder on the carriage aligned with the first, a reversely actuable piston in the second cylinder, a rod coupling the pistons of the two cylinders, and means for determining the extent and direction of actuation of the reversible piston to control the discharge from the material containing cylinder.

References Cited in the file of this patent

UNITED STATES PATENTS

| | | |
|---|---|---|
| 175,292 | McCoy | Mar. 28, 1876 |
| 1,608,111 | Moore | Nov. 23, 1926 |
| 1,664,296 | Hamerstadt | Mar. 27, 1928 |
| 1,724,395 | Conant | Aug. 13, 1929 |
| 1,983,705 | Pilblad et al. | Dec. 11, 1934 |
| 2,154,649 | Wishinsky | Apr. 18, 1939 |
| 2,161,588 | Piperoux | June 6, 1939 |
| 2,389,178 | Blount et al. | Nov. 20, 1945 |